Dec. 17, 1929.  J. T. SPARLING  1,739,806
WINDSHIELD WIPER
Filed April 14, 1927  4 Sheets-Sheet 1

INVENTOR
Joseph T. Sparling
BY Arthur C. Brown
ATTORNEY

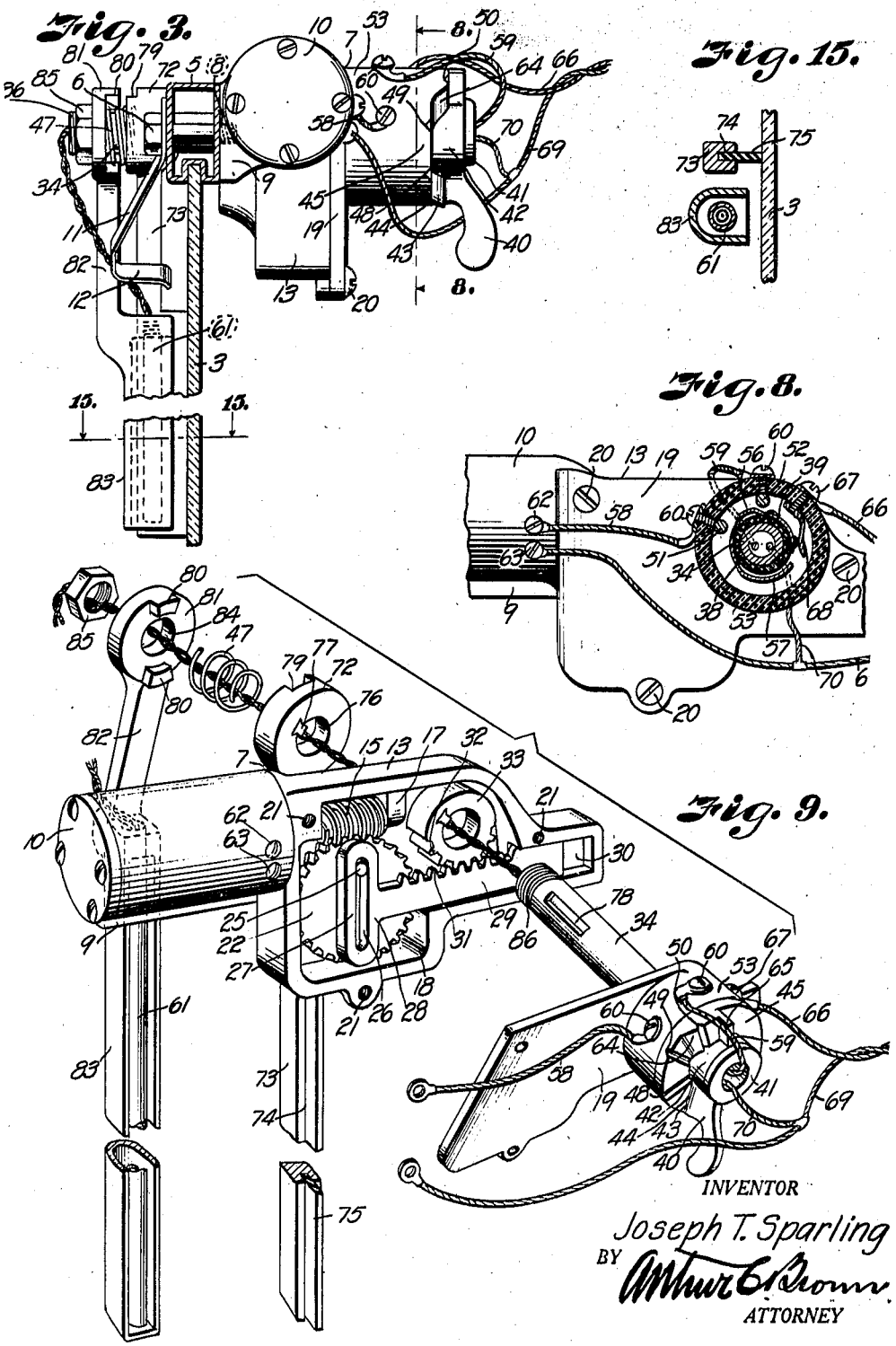

Dec. 17, 1929.  J. T. SPARLING  1,739,806
WINDSHIELD WIPER
Filed April 14, 1927    4 Sheets-Sheet 3
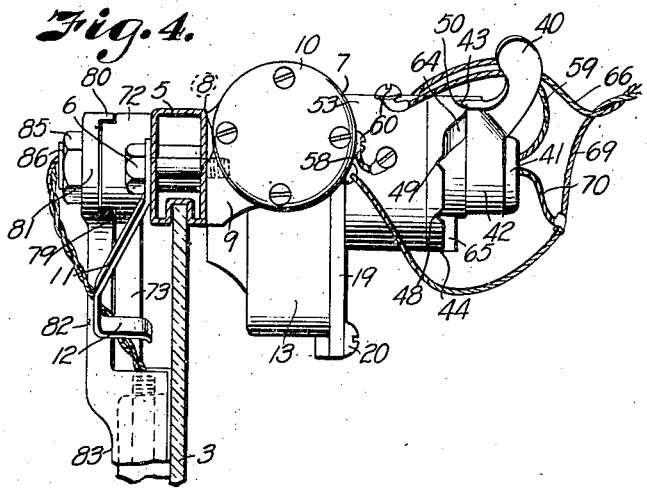
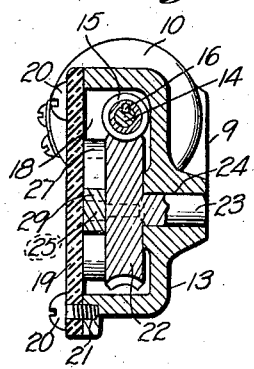
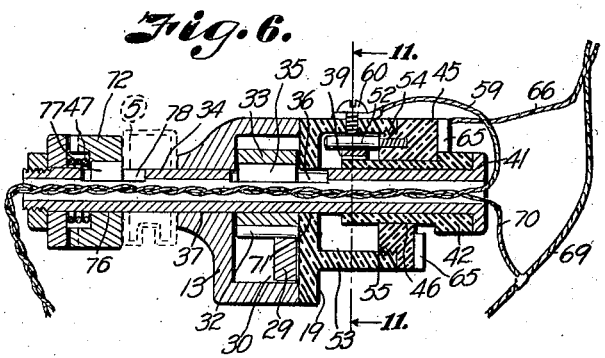
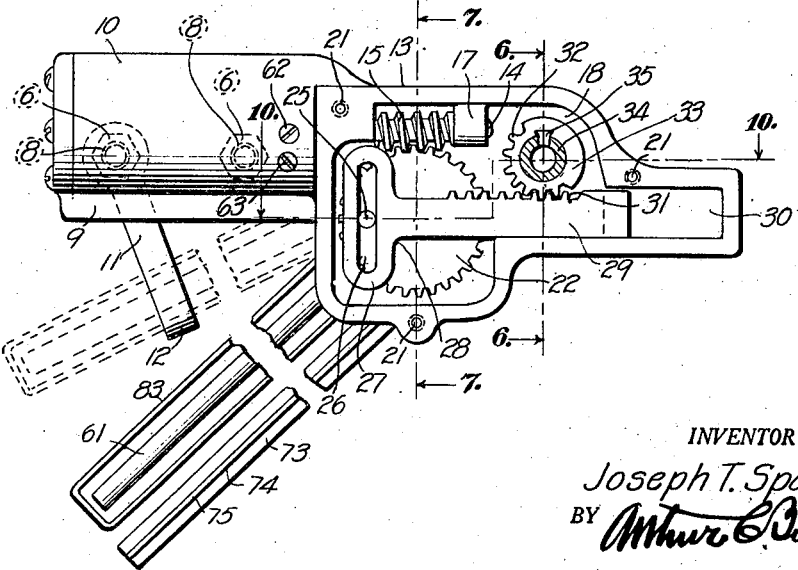
INVENTOR
Joseph T. Sparling
BY
ATTORNEY Dec. 17, 1929. J. T. SPARLING 1,739,806
WINDSHIELD WIPER
Filed April 14, 1927 4 Sheets-Sheet 4

INVENTOR
Joseph T. Sparling
BY
ATTORNEY

Patented Dec. 17, 1929

1,739,806

UNITED STATES PATENT OFFICE

JOSEPH T. SPARLING, OF TULSA, OKLAHOMA

WINDSHIELD WIPER

Application filed April 14, 1927. Serial No. 183,694.

My invention relates to cleaning devices and more particularly to devices which may be represented by windshield wipers embodying heating means, operable in combination with a rubbing mechanism and adapted for the cleaning of surfaces where the application of heat in combination with a rubbing action is required.

On motor vehicles, as examples, windshields are provided for the protection of the drivers and it is necessary that the windshields be kept clear of moisture, such as rail, sleet, snow and the like which may be deposited thereon and tend to obstruct the view of the driver. Under certain weather conditions as in those seasons wherein warm weather prevails, rain deposited on the windshield presents the chief natural hazard to which the driver of a motor vehicle is subjected. This difficulty has been largely overcome by the provision of various mechanically operated wiping devices.

However, it is a well known fact that snow and especially sleet which are prevalent during the winter season tend to freeze to the windshield and thus cannot be removed by rubbing action alone.

It is my purpose to provide a device which is readily adaptable and equally effective under the varying weather conditions of different seasons throughout the year and upon the windshield conditions that the weather phenomena produce. I have accomplished my purpose by providing wiping means and a heating element, and means of operably engaging the heating element with the wiping means when its operation is necessary, the heating element being quickly and easily disengaged when not required so that the device may function as a wiper only.

In the drawings:

Fig. 3 is an end view of the device with heater element disengaged, showing the mounting of the device on the frame of a windshield.

Fig. 4 is an end view of the device similar to that of Fig. 3 except that the switch arm is set for operation of the heater and wiper arms, the clutch members of which are shown engaged.

Fig. 5 is a side elevational view of the device with cover plate removed and showing heater and wiper arms at a sideward limit of their swing.

Fig. 6 is a section on the line 6—6, Fig. 5.

Fig. 7 is a section on the line 7—7, Fig. 5.

Fig. 8 is a section on the line 8—8, Fig. 3, showing the contact switch in inoperative position.

Fig. 9 is a perspective view of the device showing parts thereof disassembled and in their order of assembly.

Fig. 15 is a section on the line 15—15, Fig. 3.

Figure 1:
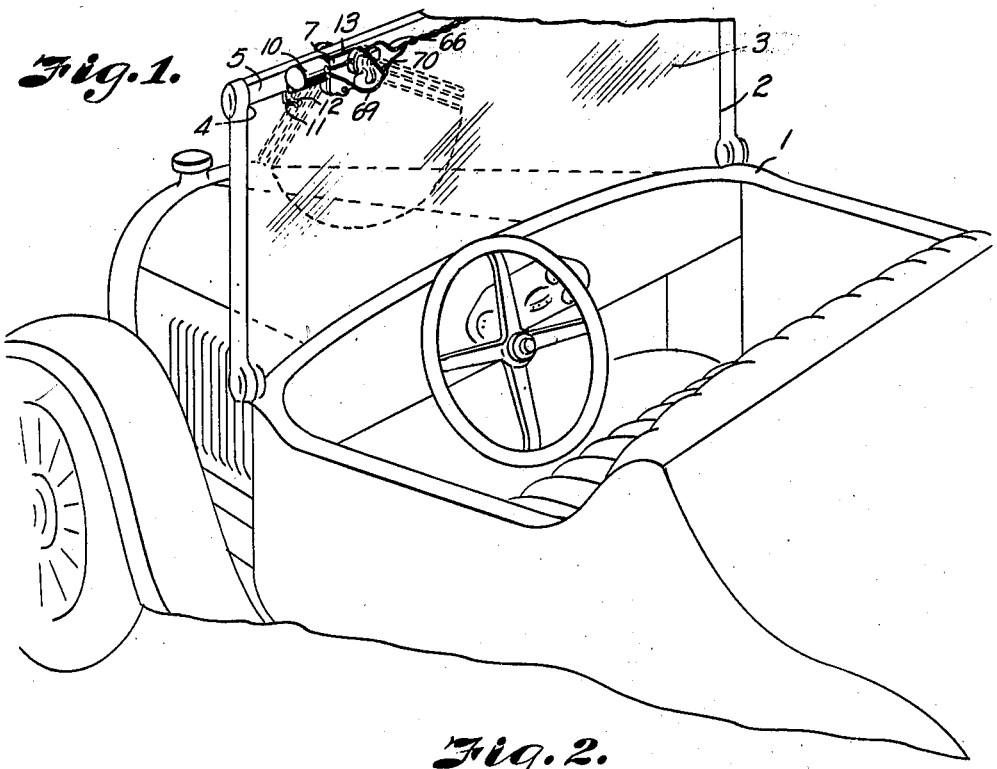
Fig. 1 is a perspective view of a device applied to the windshield of a motor vehicle.

Referring in detail to the drawings:

1 designates a portion of a motor vehicle equipped with the usual windshield 2, consisting of a transparent plate 3 mounted in a suitable frame 4. Attached to the top cross rail 5 of the frame 4 by means of cap screws 6 (Figs. 3, 4 and 5) is the cleaning device 7, said screws passing through apertures 8 in the cross rail and engaging the base 9 of a motor of standard design, represented by the casing 10. The motor is, therefore, positioned inside the car, on the driver's side of the windshield. Secured to the opposite side of the rail 5 and outside the car by one of said screws 6 is a flat spring clip 11, having an inturned end 12 provided for a purpose to be hereafter described.

A transmission housing 13 is provided integral with the motor casing 10 and extending longitudinally therefrom (Fig. 5). The motor shaft 14 (Fig. 7) protrudes into the housing and carries a worm 15 which is keyed to the shaft by a key 16. The end of the shaft is journaled in a depending ear 17 (Fig. 5) of the housing 13.

The housing 13, adapted to enclose the gear mechanism of the device, is provided with an open end 18 (Fig. 9) to permit the assembly of parts therein. A cover plate 19 of insulation material is adapted for attachment to the housing by means of screws 20 which engage in threaded openings 21 of the housing and thus close the opening 18.

Figure 10:
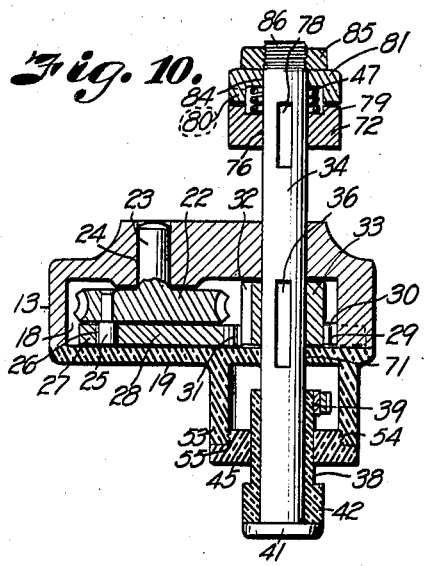
Fig. 10 is a section on the line 10—10, Fig. 5.

Engaging the worm 15 is a worm gear 22 (Figs. 5, 7 and 9) having a pivot pin portion 23 (Fig. 10) rotatable in a bearing 24 (Figs. 3 and 7) of the housing 13. Fixed in the gear and protruding from the face thereof is a crank pin 25 which engages in the vertical slot 26 in the head 27 of the T-shaped rack member 28, the rack member having a horizontally extending portion 29 projected longitudinally of the housing and reciprocable in a guide opening 30 formed by the assembled housing and cover plate.

Formed on the upper edge of said portion 29 are rack teeth 31, which are engaged by the teeth 32 of a sleeve-like gear segment 33 that is mounted on a tubular shaft 34 which will be particularly described.

The gear segment 33 is rendered rotatable with the shaft 34, and the shaft is rendered slidable through the segment, by means of a key 35 fixed in the segment upon assembly, and the provision of an elongated key slot 36 in the shaft, the key 35 being seated in the slot for slidable movement of the shaft therealong. The shaft 34 is projected through and is slidable in a bearing 37 of the housing provided adjacent the portion of the housing contacting the cross rail 5, the shaft projecting also through the cross rail in the manner and for purposes to be described.

In referring to relative positions I shall designate the parts of the device adjacent the driver's position as the forward parts of the device that extend at right angles to the windshield and rail, and the parts remote from the driver, for example the projecting end of the shaft 34, as the rear portions.

Figure 14:
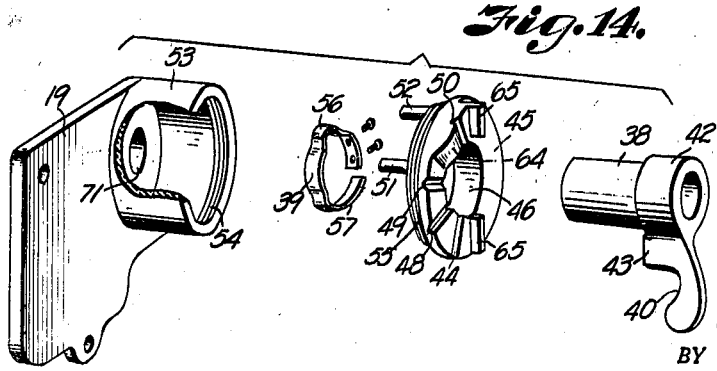
Fig. 14 is a perspective view of the contact switch and its mounting members, dissociated but related.

A lever-actuated sleeve member 38 is provided, of insulation material, supported in right angular relation to the housing 13 and by a member fixed to said housing, as will be described, and a flat spring switch contact member 39 is annularly installed on the sleeve, and secured thereto, adjacent the rearward end of the sleeve. The forward end of the sleeve is provided with a switch-operating lever arm 40, integral therewith. The forward end of the shaft 34 is rotatably mounted in the sleeve 38, and extends slightly beyond said sleeve, being provided with an annular flange 41 on the projecting end whereby the shaft engages the sleeve, the end of the sleeve being provided with a collar 42 integral therewith and against which the flange 41 bears to force the sleeve into travel with the shaft, as will be shown. The lever-sleeve 38 is further provided with a V-shaped tooth 43 integral therewith and extending from the collar portion thereof, adapted to latch the sleeve, for non-operating position of the parts, by reception in a V-shaped groove 44 provided in an annular bearing plate 45 (Fig. 14), having the opening 46 to receive the sleeve, which is loosely supported thereby. The bearing plate is positioned on the sleeve between the said contact ring 39 and the collar 42, and provided with other elements for control of the lever-sleeve and anchored against rotation, as will be disclosed.

The sleeve is rotatable in the bearing plate by means of the lever 40. The sleeve is slidable in the plate, in conjunction with the shaft 34 sleeved within it, under actuation of a coil spring 47 mounted on the shaft 34 and restrained by elements to be mentioned in connection with later description, the provision of means for longitudinal movement of the sleeve and shaft being referred to at this time to indicate the reasons for further features of the bearing plate. The plate 45 is provided with additional V-shaped notches 48, 49 and 50, annularly positioned and radial to the plate, to receive the radial tooth 43 of the switch-lever sleeve.

Contact pins 51 and 52 project from and are threadedly secured to the bearing plate, positioned and adapted to be contacted by portions of the contact member.

A cylindrical switch housing 53 is provided integral with the cover plate 19, and having interior threads 54 whereby the threaded portion 55 of the bearing plate 45 is received and secured thereto, so that the bearing plate is held against rotation and constitutes a closure for the switch housing, and the pins 51 and 52 of the plate and the control member 39, are enclosed in the switch housing.

The contact member has a loop portion or contact point 56, adapted to contact a pin, and an elongated raised portion 57 adapted to contact one or more pins, upon rotation of the lever sleeve 38.

The wires 58 and 59 are connected to the contact pins 51 and 52 by means of the screws 60 that perforate the switch housing. The wire 59 is conducted into the forward end of the tubular shaft 34, and therethrough, and to a heating element 61 that depends from the device and is adapted to influence the temperature of the windshield.

Motor terminals 62 and 63 are provided on the motor housing 10. The wire 58 that is in contact with the contact pin 51 of the bearing plate, is connected with the terminal 62, for control of the motor by the switch mechanism.

The relations and correspondences between the notches in the bearing plate 45 and the raised or contact portions of the contact member 39 will now be described.

Figure 12:
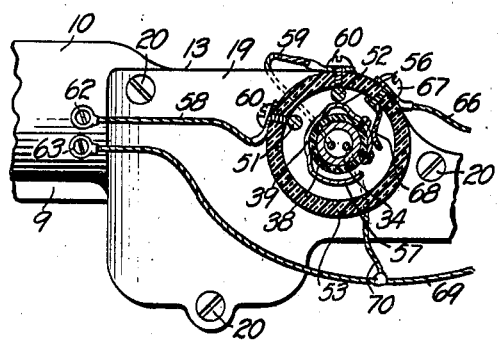
Fig. 12 is a view similar to that of Fig. 11, except that the contact switch is in position for energizing the heater element separately.

As mentioned, seating of the lever sleeve tooth 43 in the notch 44 represents and accomplishes a condition of non-actuation. Rotation of the lever sleeve and seating of the tooth in the notch 48 results in the contacting of the loop point 56 of the contact member with the contact pin 52 (Fig. 12), which through the screw 60 and the insulated wire 59 makes connection with the heater element 61.

The notch 49 when engaged by the tooth 43 corresponds to the engagement of the extended radial portion 57 of the switch contact member 39 with the contact pin 51 which, through the screw 60 and the insulated wire 58 makes connection with the terminal 62 of the motor 10.

Figure 11:
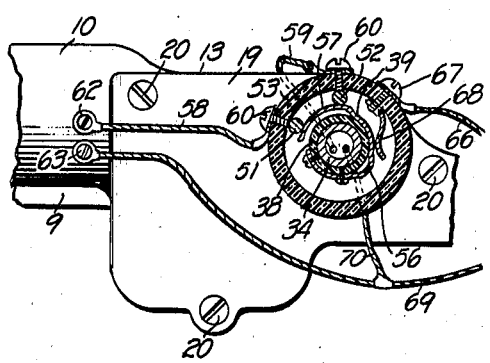
Fig. 11 is a section on the line 11—11, Fig. 6, showing the contact switch for operation of both the heater and wiper arms.

A cam 64 is provided on the face of the bearing plate 45 and the notch 50 is positioned on this cam so that when the tooth 43 is shifted from the notch 49 to the notch 50, the sleeve 38 and the shaft 34 slide forward in the bearing opening 46 against the compression of the coil spring 47, above referred to. In this position the radial portion 57 of the switch member 39 is advanced so that it contacts (Fig. 11) both the pin 51, which makes connection to the motor 10, and the pin 52, which makes connection to the heater element 61.

Ears 65 are provided on the bearing plate 45 adjacent the notches 44 and 50 respectively to be engageable by the switch lever 40 and thus serve as stops to prevent overtravel of the switch contact member.

Electrical current is supplied to the switch contact 39 through a wire 66, which leads from a source of electrical energy to a screw 67 on the switch housing 56. An elastic contact brush 68 is secured to the screw within the housing and is adapted for continuous contact on the irregular outer surface of the contact member 39.

A return wire 69 is connected to the motor terminal 63. By means of a wire 70 attached to the wire 69 and which with the wire 59, passes through the tubular shaft 34, connections are made with the contact switch 39 and the connections heretofore stated completed circuits by which the heater element 61 or the motor 10 may be operated separately or whereby they may be operated simultaneously.

An opening 71 is provided in the cover plate 19, concentric with the cylindrical switch housing. The rear end of the sleeve 38 is enclosed in the housing. The tubular shaft 34, however, as suggested, extends exteriorly of the windshield and the opening 71 is provided to permit such extension through the cover plate and the transmission housing 13, the shaft being slidable in the opening 71.

The operative elements of the device are carried and positioned on the front side of the windshield, that is, on the side thereof opposite the position of the switch housing and motor, the parts of projecting elements thus positioned being referred to as the rearward parts.

Positioned on the rearward end of the shaft 34 and exterior to the windshield (Fig. 6) is the hub 72 of a wiping arm 73 provided with a slot 74 extending longitudinally thereof and which receives a wiper member 75 of soft resilient material, preferably of rubber, which is pressed into the slot.

The hub 72 has the opening 76 to receive the shaft 34 and into this opening protrudes a key 77 which is secured in the hub upon assembly. The key is adapted for slidable engagement in a slot 78 in the shaft 34. When assembled for operation, one end of the hub 72 abuts the outer side of the cross rail 5 and the opposite end of the hub is counter-bored to receive the coil spring 47, thus providing one bearing for said spring for influencing the shaft 34 and sleeve 38. A slot 79 extends across the rearward end of the hub and is engageable by lugs 80 extending forwardly from the face of a hub 81 carried by the shaft and which carries an arm 82 that is angularly disposed relative to the upper portion of the arm 73.

Formed integrally with the arm 82 is a shield 83 adapted to contain the heater element 61. The heater element is supported by threaded engagement in an opening in the upper end of the shield. Said shield is so disposed relative to the arm 82 that when the clutch portions of the hubs are engaged, the shield is positioned closely and parallel to the wiper arm 73. An opening 84 in the hub 81 receives the shaft 34 for free rotative movement therein and a nut 85 engages the threaded end 86 of the shaft, retaining the members in the shaft and limiting the separation of the hub members 72 and 81, the shaft being admitted to the hub side of the windshield through the opening 87 of the cross rail 5. The hubs are normally held in disengaged position by the spring 47, as shown in Figs. 2 and 3.

Figure 2:
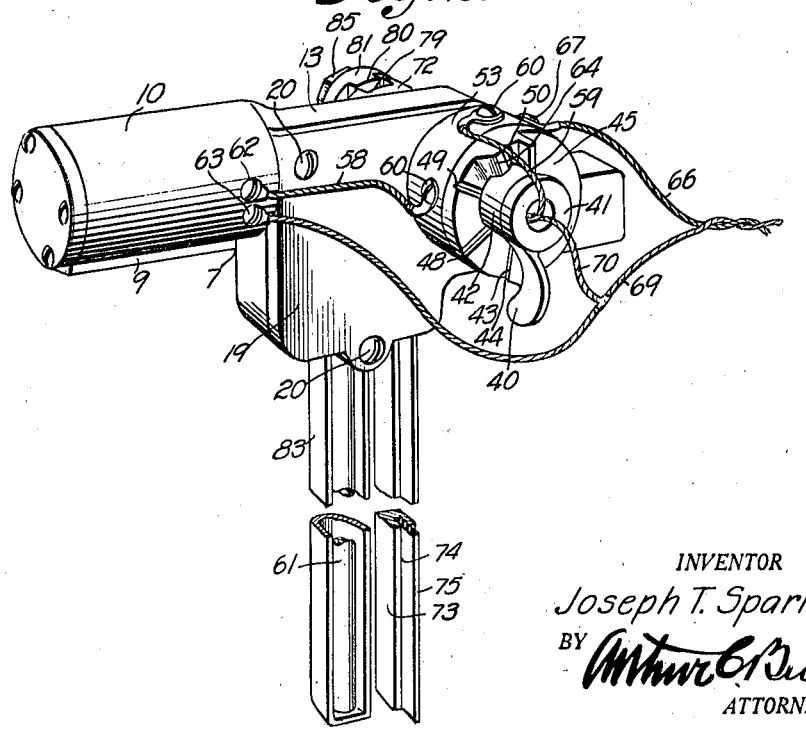
Fig. 2 is an enlarged perspective view of the device.

Attention is now directed to Figs. 2, 3 and 9, wherein the device is shown as comprising a motor 10 operably connected to the transverse shaft 34 by means of transmission mechanism consisting of the worm 15 on the motor shaft, a worm gear 22 and a rack member 28. The rack member is reciprocated by the worm gear 22 and engages with the gear segment 33 on the shaft 34 by which said shaft is rocked to cause the hub 72 keyed with it to rock and the hub in turn to cause its arm to swing.

The hub 81 which carries the heater element 61 is mounted on the shaft 34 but it has no means of direct operable connection with the shaft. The hub 72, however, that serves the wiper arm 73, is keyed to the shaft 34 so as to rotate therewith, but the shaft is slidable through the hub. Withdrawal of the shaft to press the end nut 85 against the hub 81 will cause the hub 81 to move towards the hub 72 which, in turn, is restrained by the cross rail 5 of the windshield. The hubs are engaged upon being brought together by the reception of the lugs 80 in the slot 79 of the hub 72, so that the oscillation of the hub 72 would cause the oscillation of the hub 81. The hubs as stated are normally spaced by the spring 47.

The spring 47, bearing against the hub 72 and so against the windshield, bears also against the hub 81 and so against the nut on the end of the shaft 34. An effect of the action of the spring is to restrain the shaft in an established position as set up by seating the tooth of the lever sleeve in a notch of the bearing plate.

When it is desirable that only the wiper be operated, the hub 81 being spaced and disconnected from the hub 72, the arm 82, the shield 83, and the heater element 61, which constitute the heating unit, are manually swung sidewardly and put into engagement with the spring clip 11 so that the shield 83 rests on the tongue 12 as illustrated in dotted lines in Fig. 5. In this position the arm 73 is free from interference by the heating unit in the path of its travel.

Figure 13:
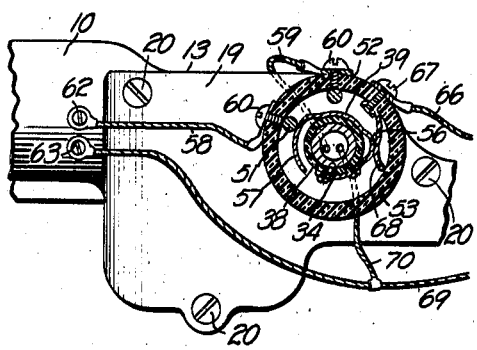
Fig. 13 is a view similar to that of Fig. 11, except that the contact switch is in position to energize the motor to operate the wiper arm separately.

In order to set the wiper arm in operation by energizing the motor and establishing transmission, the switch lever 40 is moved clockwise, disengaging the tooth 43 from the notch 44, the inoperative position, and being passed over the notch 48, it is moved until it seats in the notch 49. Thus the switch contact member 39 is positioned as shown in Fig. 13, the elongated radial portion 59 thereof engaging the pin 51 so that electric current supplied by th. wire 66 passes through the current source screw 67 and the tensioned brush 68. The member 39 being in contact with the pin 51, the current is admitted to the motor 10 through the wire 58 and it flows from the motor through the wire 69. In this condition the device operates as a wiper only, the arm 73 swinging to and fro, the rubber wiper 75 contacting the glass 3 and being pressed thereagainst by the spring 47 which is compressed between the hubs 72 and 81.

It sometimes happens that ice freezes to the windshield glass to such thickness that it is necessary that the heat be concentrated over a certain spot for a time in order that the ice may be melted. To accomplished this the heater unit is disengaged from the clip 11 and positioned over the desired spot. The switch lever is then positioned so that the tooth 43 engages the notch 48, in which position the raised portion 56 of the switch contact member 39 engages the contact pin 52 (Fig. 12), thus closing the electrical circuit to the heater element 61 so that heat is generated thereby. The heat is conveyed and deflected to the glass 3 by the shield 83.

In the three positions of the contact switch just described, the clutch portions of the hubs 72 and 81 remain disengaged since they are yieldingly held apart by the spring 47.

Under certain weather conditions as when driving during sleeting or snowing, it is necessary that the wiper be operated in order to keep the windshield clear, and equally necessary that the snow or ice be melted so that the wiper may be effective in its functioning.

To accomplished the combination of operations the heater unit is manually grasped and disengaged and lowered from its engagement with the clip 11 to the position indicated in Fig. 2. The switch lever is shifted clockwise to the position indicated in Fig. 4, the switch contact member 39 assuming the corresponding position indicated in Fig. 11. In rotating the lever to attain this position, the inclined face of the tooth 43 engages the cam 64, thus pulling the sleeve 38 outwardly which, by its engagement with the shaft 34, also causes said shaft to slide in the opening 76 in the hub 72, the bearing 37, the opening 71 in the cover plate 19 and the opening in the gear segment 33. This sliding movement results in the hub 81 of the heater unit being drawn toward the hub 72 of the wiper unit, thus engaging the lugs 80 in the slot 79 so that the actuation of the hub 72 will cause the moving of hub 81.

Simultaneously with the camming operation, the elongated radial portion 57 of the switch contact member 39 is positioned so as to engage both contact pins 51 and 52 and thus the heater element 61 is energized and the motor is set in operation, so that the energized heater unit and wiper arm will be operated together. In this position the tooth 43 on the lever 40 engages in the notch 50 on the flat portion of the cam 64 and the lever 40 is in contact with the stop ear 65.

What I claim and desire to secure by Letters Patent is:

1. A windshield cleaner including a driving member, a wiper operatively connected with the driving member, an independent heating member, and means for selectively engaging the heating member with the wiper for actuating the heating member simultaneously with the wiper.

2. A windshield cleaner including a motor, a wiper in constant driving relation with the motor, a heater, and means for selectively establishing driving relation between the wiper and the heater.

3. A windshield cleaner including a motor, a wiper in constant driving relation with the motor, a heater, means for selectively establishing driving relation between the heater and the wiper including a brush and contact points engageable by the brush for closing a circuit through the heating member when the latter is in driven relation with the wiper.

4. A windshield cleaner including an electric motor, a wiper operable by the motor, a normally idle heating member, and a member including a switch operable to establish mechanical driving relation between the heating member and wiper and close a circuit in the heating member.

5. A windshield cleaner including an electric motor, a wiper in driving relation with the motor, an electric heater, and a switch operable to successively close the circuits in the motor and heater and mechanical elements for operatively connecting the heater with the motor.

6. A windshield cleaner including an electric motor, an electric heater adapted to be operated by the motor, means including a member connected with the motor for enabling the motor to operate the heater, and a member including a switch operable to selectively energize the motor and the heater and to establish operating relation between the motor and the heater.

7. In a windshield wiper, a motor fixed to the windshield, a wiper arm oscillatable by the motor, a heater element selectively engageable with the wiper arm, and means selectively energizing the motor and the heater element.

8. In a windshield wiper, a heating element, a separate wiper arm, means for rocking the wiper arm, means for selectively connecting the heating element with the wiper arm for rocking motion therewith, and means for energizing the heating element.

9. In a windshield cleaner, an electric motor, a wiper arm actuatatable by the motor, a heating element engageable with the wiper arm for actuation thereby, means controlling energization of the heater element, and means for setting up actuation of the wiper arm comprising a shaft engaged with the wiper arm and driven by the motor, and a switch member rotatably mounted on the shaft and having contact points selectively contactable with terminals to close a circuit through the motor.

10. In a windshield cleaner, an electric motor, a wiper arm, an electric heating element engageable with the wiper arm for actuation thereby, and means actuating the wiper arm comprising a shaft longitudinally slidable in the wiper arm and rotatable by the motor, a switch member rotatably mounted on the shaft and having contact points selectively contactable with terminals to close the circuits in the motor and heating element.

11. In a windshield cleaner, an electric motor, a wiper arm, an electric heating element engageable with the wiper arm for rotation thereby, and means actuating the wiper arm comprising a shaft longitudinally slidable in the wiper arm and rotatable by the motor, and a switch member rotatably mounted on the shaft and having contact points selectively contactable with terminals to simultaneously close the circuit in the motor and heating element.

12. In a windshield cleaning device, an electric motor, a transmission assembly comprising a rack reciprocable by the motor and a gear segment rocked by the rack, a shaft slidable in said segment and keyed to the segment against rotation therein, a wiper arm slidable on the shaft and keyed thereto against rotation, and means controlling oscillation of the wiper arm comprising a lever sleeve rotatably mounted on the shaft and provided with a lever arm and a contact member, terminals positioned for selective contacts by the contact member, and means for selectively positioning said lever arm.

13. In a windshield cleaning device, an electric motor, a rack reciprocable by the motor, a gear segment rocked by the rack, a shaft slidable in said segment, a wiper arm slidable on the shaft, a heating element rotatably mounted on the shaft and engageable with the wiper arm for rotation thereby, and means controlling oscillation of the wiper arm comprising a lever sleeve rotatably mounted on the shaft and provided with a lever arm and a contact member, terminals positioned for selective contacts by the contact member, and means for positioning said lever arm for establishment of selected circuits to energize the motor to actuate said segment and shaft and to energize the heating element.

14. In a windshield cleaning and heating device, an electric motor, a wiper arm, a shaft slidable in the wiper arm and engageable therewith, a housing, a transmission assembly in the housing, a shaft engageable with said assembly for limited rotation by the motor, a heating member movably borne by the shaft and engageable with the wiper arm, and means for effecting actuation of the heating member comprising a switch element rotatably mounted on the shaft and having means for selectively closing the motor and heating element circuits, and a cam on the housing engageable by the switch element upon rotation thereof to shift the shaft and induce engagement of the heating element with the wiper arm.

15. A windshield cleaner including a driving shaft and means for actuating the shaft, a wiper keyed to the shaft, a heater rotatable on the shaft, means effective upon shifting of the heater on the shaft for effecting driving connection between the shaft and the heater, and means for shifting the heater.

16. A windshield cleaner including a wiper adapted for reciprocation in a fixed path, a driving shaft keyed to the wiper and movable longitudinally relative thereto, a heater rotatable on the shaft, clutch means between the heater and the wiper, means normally yieldingly spacing the heater from the wiper, said shaft being adapted to move the heater, and means for shifting the shaft to move the heater to clutch engagement with the wiper against the tension of said yielding means.

17. In a windshield cleaner, a motor, a wiper arm actuable by the motor, a heater element normally disconnected from the wiper arm, means for operatively connecting the heater element with the wiper arm for actuation thereby, means for heating the heater element, and means controlling the actuation of the wiper arm including means controlling said heating means.

In testimony whereof I affix my signature.

JOSEPH T. SPARLING.